United States Patent
Okazaki et al.

(10) Patent No.: US 10,826,884 B2
(45) Date of Patent: Nov. 3, 2020

(54) INFORMATION PROCESSING SYSTEM, INFORMATION PROCESSING METHOD, AND NON-TRANSITORY COMPUTER-READABLE RECORDING MEDIUM

(71) Applicant: MICWARE CO., LTD., Hyogo (JP)

(72) Inventors: Ryosuke Okazaki, Hyogo (JP); Makoto Ito, Hyogo (JP)

(73) Assignee: MICWARE CO., LTD., Hyogo (JP)

( * ) Notice: Subject to any disclaimer, the term of this patent is extended or adjusted under 35 U.S.C. 154(b) by 106 days.

(21) Appl. No.: 16/306,313

(22) PCT Filed: Jun. 5, 2017

(86) PCT No.: PCT/JP2017/020820
§ 371 (c)(1),
(2) Date: Nov. 30, 2018

(87) PCT Pub. No.: WO2017/209310
PCT Pub. Date: Dec. 7, 2017

(65) Prior Publication Data
US 2019/0132302 A1  May 2, 2019

(30) Foreign Application Priority Data

Jun. 3, 2016  (JP) ................................. 2016-112135

(51) Int. Cl.
*H04L 29/06* (2006.01)
*G06Q 20/12* (2012.01)
(Continued)

(52) U.S. Cl.
CPC .............. *H04L 63/08* (2013.01); *G06F 21/10* (2013.01); *G06F 21/44* (2013.01);
(Continued)

(58) Field of Classification Search
CPC ......... H04L 63/08; G06F 21/10; G06F 21/44; G06Q 20/0855; G06Q 20/127; G06Q 20/40; G07B 15/00
See application file for complete search history.

(56) References Cited

U.S. PATENT DOCUMENTS 9,722,781 B2 *  8/2017  Smereka .................... H04L 9/32
10,608,818 B2 *  3/2020  Watanabe ............... G06F 21/31
(Continued)

FOREIGN PATENT DOCUMENTS

| JP | 2005-331680 A | 12/2005 |
| JP | 2013-142994 A | 7/2013 |
| JP | 2015-17958 A | 1/2015 |

OTHER PUBLICATIONS

International Search Report issued in PCT/JP2017/020820 dated Aug. 29, 2017 with English Translation (5 pages).

*Primary Examiner* — Hee K Song
(74) *Attorney, Agent, or Firm* — Nakanishi IP Associates, LLC (57) ABSTRACT

An information processing apparatus is communicably connected to a server and performs authentication without inconvenience to a user. An information processing system includes an information processing terminal, a server, and an information processing apparatus. The information processing terminal is defined as a central device, and the server and the information processing apparatus are defined as peripheral devices in the information processing system. The information processing terminal and the server are connected to each other, and the information processing terminal and the information processing apparatus are connected to each other. The information processing terminal performs authentication of the information processing apparatus with the server.

6 Claims, 7 Drawing Sheets

(51) Int. Cl.
*G06F 21/44* (2013.01)
*G06Q 20/08* (2012.01)
*G06F 21/10* (2013.01)
*G07B 15/00* (2011.01)
*G06Q 20/40* (2012.01)

(52) U.S. Cl.
CPC ....... *G06Q 20/0855* (2013.01); *G06Q 20/127* (2013.01); *G06Q 20/40* (2013.01); *G07B 15/00* (2013.01)

(56) References Cited

U.S. PATENT DOCUMENTS

| | | | |
|---|---|---|---|
| 2006/0293964 A1 | 12/2006 | Akihata | |
| 2009/0119779 A1 | 5/2009 | Dean et al. | |
| 2013/0179689 A1* | 7/2013 | Matsumoto | H04L 9/32 713/171 |
| 2014/0201065 A1* | 7/2014 | Cox | G06Q 40/02 705/39 |
| 2015/0058224 A1* | 2/2015 | Gaddam | G07B 15/063 705/44 |
| 2015/0220916 A1* | 8/2015 | Prakash | G06Q 20/40 705/41 |
| 2016/0125458 A1* | 5/2016 | Enriquez | G06Q 30/0253 705/14.27 |
| 2017/0243410 A1* | 8/2017 | Caballero | G06Q 10/08 |
| 2018/0012272 A1* | 1/2018 | Menard | H04L 9/3273 |

* cited by examiner

Fig. 7

INFORMATION PROCESSING SYSTEM, INFORMATION PROCESSING METHOD, AND NON-TRANSITORY COMPUTER-READABLE RECORDING MEDIUM

FIELD OF INVENTION

The present invention relates to an information processing system, an information processing method, and a non-transitory computer-readable recording medium.

BACKGROUND ART

In an existing information processing system, a server and an information processing apparatus are communicably connected to each other, and information in the server is transmitted from the server to the information processing apparatus to update information in the information processing apparatus. More specifically, map information in the server is transmitted from the server to an in-vehicle device to update map information in the in-vehicle device.

Patent Literature 1 describes one such technique, with which a server and an information processing apparatus are communicably connected to each other, and an update from the server is transmitted to the information processing apparatus.

CITATION LIST

Patent Literature

Patent Literature 1: Japanese Unexamined Patent Application Publication No. 2015-17958

SUMMARY OF INVENTION

Technical Problem

To update information in the information processing apparatus (e.g., an in-vehicle device installed in a vehicle), the user manually inputs identification information (e.g., vehicle identification number code, or VIN code) or the license key assigned to the in-vehicle device into the server or the in-vehicle device to allow the server to recognize the in-vehicle device. Such authentication to be performed before updating information in the in-vehicle device can be troublesome or inconvenient to the user.

One or more aspects of the present invention are directed to an information processing system in which an information processing apparatus is communicably connected to a server and performs authentication without inconvenience to a user.

Solution to Problem

An information processing system according to a first aspect of the present invention includes an information processing terminal, a server, and an information processing apparatus. The information processing terminal is defined as a central device, and the server and the information processing apparatus are defined as peripheral devices in the information processing system. The information processing terminal and the server are connected to each other. The information processing terminal and the information processing apparatus are connected to each other. The information processing terminal performs authentication of the information processing apparatus with the server.

In the first aspect of the present invention, the information processing terminal is defined as the central device in the information processing system and performs the authentication of the information processing apparatus with the server based on identification information about the information processing apparatus (e.g., a unit recognition number). The information processing terminal can be used to remotely perform the authentication of the information processing apparatus. The information processing apparatus can thus be communicably connected to the server and receive authentication without inconvenience to the user. In this system, the information processing terminal serves as the central device in the information processing system and outputs instructions to actively operate the server and the information processing apparatus.

In the first aspect, the information processing terminal may obtain the identification information about the information processing apparatus, and may perform the authentication of the information processing apparatus with the server based on the obtained identification information.

In this case, the information processing terminal can perform the authentication of the information processing apparatus with the server, with the information processing terminal serving as the master (initiator) in passing the identification information and the server and the information processing apparatus serving as slaves in passing the identification information.

In the first aspect, the authentication may include setting an authentication validity period.

In the first aspect of the present invention, the authentication of the information processing apparatus with the server is also used to continuously receive information (services) stored in the server, and is useful for such continuous service use. The authentication is particularly useful for services that involve information updates associated with, for example, the communication environment or the map information, or services with a limited period of time or with a limited count of use, such as rental cars or content services.

In the first aspect, the authentication may include payment.

In this case, the authentication including the payment can be used for fee-based services and communication. The payment can be performed with the information processing terminal serving as the master and the information processing apparatus and the server serving as slaves. This eliminates a payment system in the information processing apparatus, and simplifies the structure of the information processing apparatus. The payment system may refer to a system for payment using credit cards and electronic money.

An information processing terminal according to a second aspect of the present invention is usable in the information processing system according to the first aspect of the present invention including the information processing terminal, the server, and the information processing apparatus. The information processing terminal is defined as a central device in the information processing system, and performs authentication of the information processing apparatus with the server.

The information processing terminal according to the second aspect is included in the information processing system according to the first aspect, and is defined as the central device in the information processing system and performs the authentication of the information processing apparatus with the server. The information processing terminal according to the second aspect produces the same advantageous effects as the information processing terminal included in the information processing system according to the first aspect of the present invention, and will not be described.

An information processing method according to a third aspect of the present invention includes defining an information processing terminal as a central device and a server and an information processing apparatus as peripheral devices in an information processing system, connecting the information processing terminal and the server to each other and the information processing terminal and the information processing apparatus to each other, and performing, with the information processing terminal, authentication of the information processing apparatus with the server.

The information processing method according to the third aspect produces the same advantageous effects as the information processing system according to the first aspect of the present invention, and will not be described.

An information processing program according to a fourth aspect of the present invention is for an information processing system including an information processing terminal, a server, and an information processing apparatus. The program implements defining the information processing terminal as a central device and the information processing apparatus and the server as peripheral devices in the information processing system, connecting the information processing terminal and the server to each other and the information processing terminal and the information processing apparatus to each other, and performing, with the information processing terminal, authentication of the information processing apparatus with the server.

The information processing program according to the fourth aspect produces the same advantageous effects as the information processing system according to the first aspect of the present invention, and will not be described.

Advantageous Effects

The system, terminal, method, and program according to the above aspects of the present invention allow an information processing apparatus to be communicably connected to a server and perform authentication without inconvenience to a user.

DETAILED DESCRIPTION

An information processing system 1 according to one embodiment will now be described with reference to the drawings.

Figure 1:
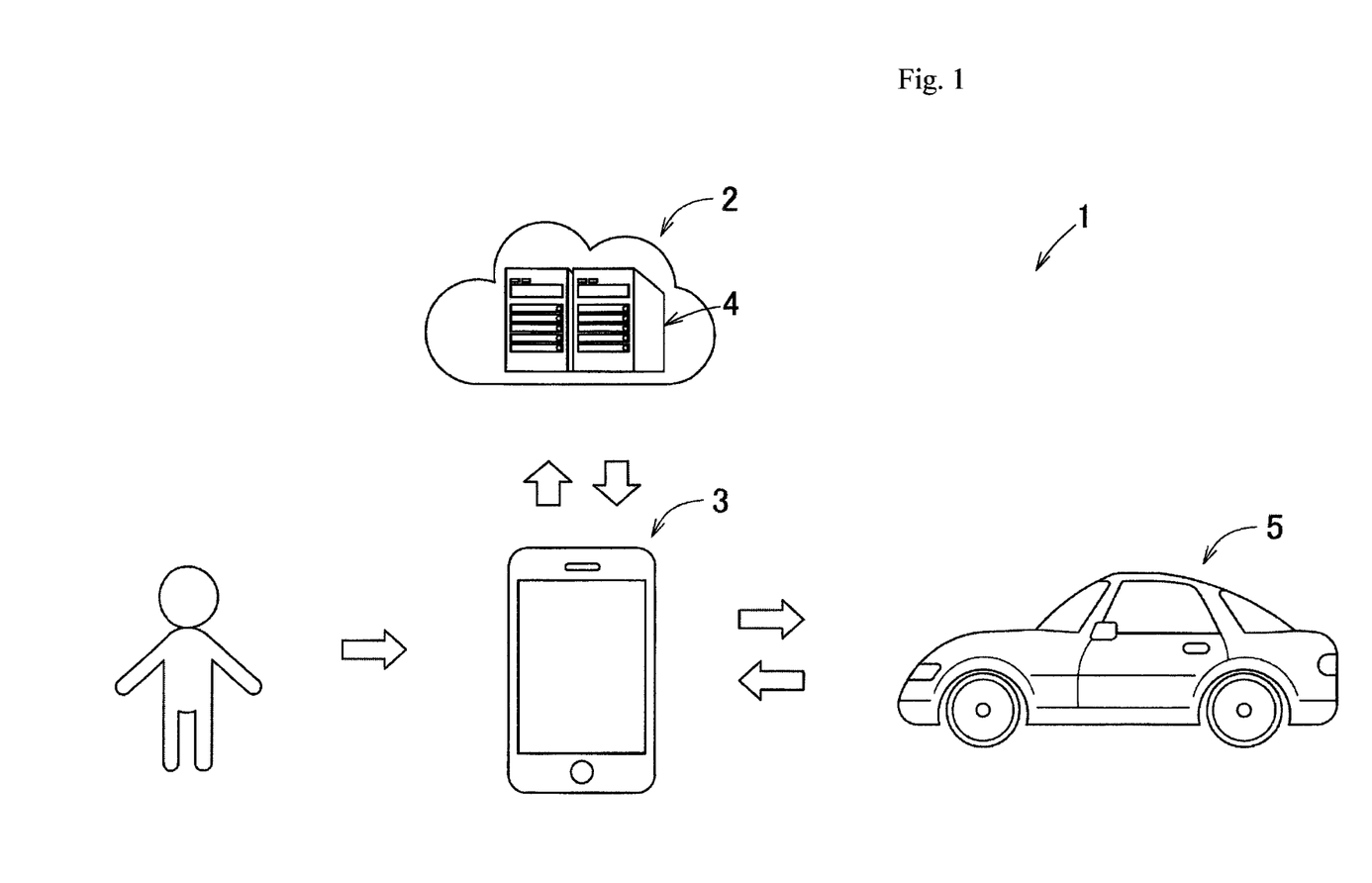
FIG. 1 is a schematic diagram of an information processing system according to one embodiment.

As shown in FIG. 1, the information processing system 1 according to the present embodiment includes an information processing terminal 3, a server 4, and an information processing apparatus 5 that performs information processing. The information processing terminal 3 and the server 4 are communicably connected to each other with a network 2 to allow mutual communication. The information processing terminal 3 and the information processing apparatus 5 are communicably connected directly to each other with a short-range communication technology such as Bluetooth Low Energy (BLE), Bluetooth (BT, registered trademark), or Wi-Fi. The server 4 and the information processing apparatus 5 are communicably connected to each other via the information processing terminal 3.

Figure 2:
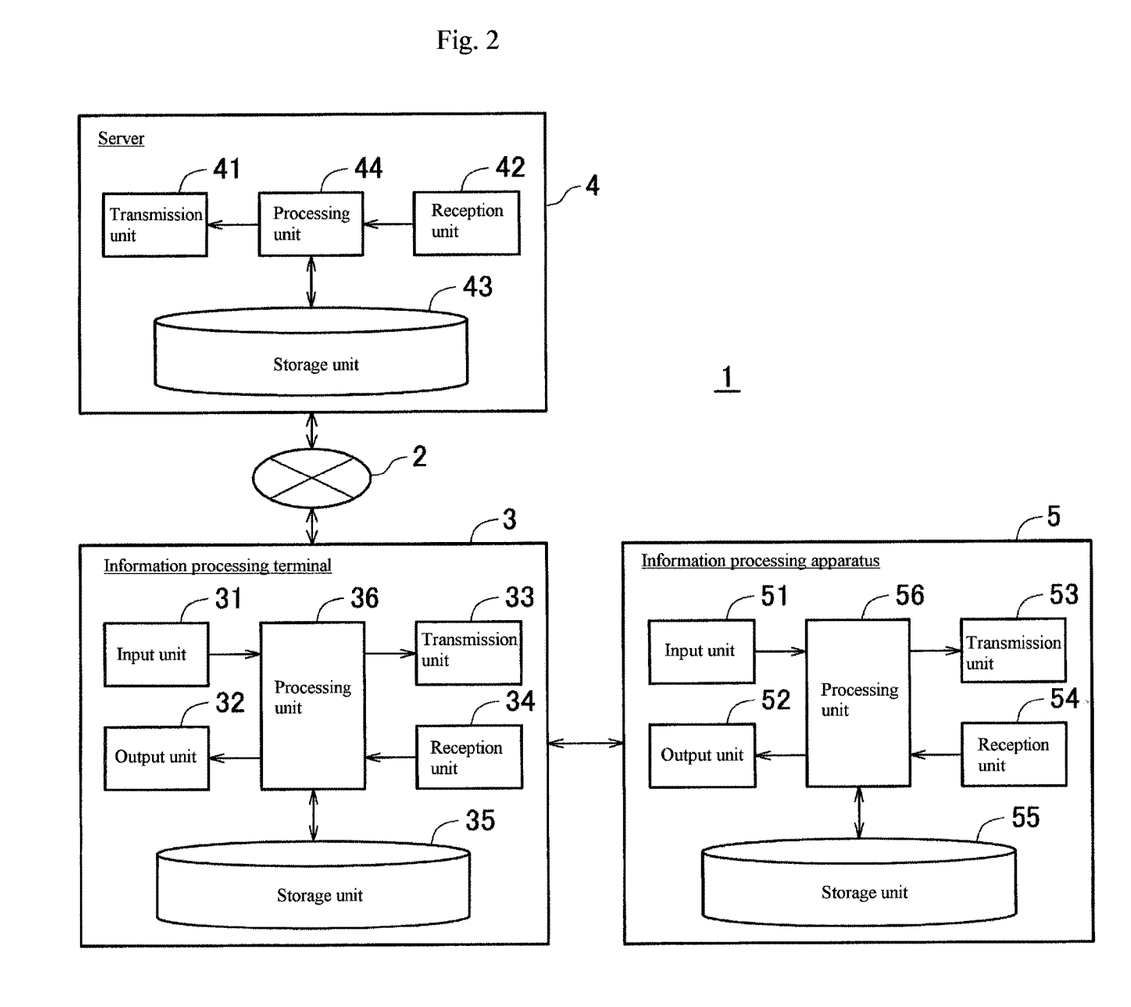
FIG. 2 is a schematic block diagram of the information processing system according to the embodiment.

The information processing terminal 3 is a mobile terminal such as a smartphone or a tablet terminal, and includes at least an input unit 31, an output unit 32, a transmission unit 33, a reception unit 34, a storage unit 35, and a processing unit 36 as shown in FIG. 2. The information processing terminal 3 is defined as a central device serving as the master in the information processing system 1. The mobile terminal may be any portable terminal, including a wearable terminal.

The input unit 31 may include a touch panel or a touch pad that receives an operational input (touch input into the touch panel) and a microphone that receives an audio input.

The output unit 32 may include a display (touch sensitive) that shows various items of information and a speaker or an audio output terminal that outputs sound.

The transmission unit 33 transmits various items of information to the server 4 and the information processing apparatus 5. In the present embodiment, the transmission unit 33 transmits information about authentication, or more specifically information about activation of application software (navigation system).

The reception unit 34 receives various items of information from the server 4 and the information processing apparatus 5. In the present embodiment, the reception unit 34 receives authentication information, or more specifically information about activation of application software (navigation system).

The storage unit 35 may include memory and storage, and may also include a temporary storage unit (not shown) for temporarily storing information.

The processing unit 36, which is a micro processing unit (MPU), serves as a controller for the information processing terminal 3 (refer to an authentication process described below).

As shown in FIG. 2, the server 4 includes at least a transmission unit 41, a reception unit 42, a storage unit 43, and a processing unit 44. The server 4 is defined as a peripheral device serving as a slave in the information processing system 1.

The transmission unit 41 transmits various items of information to the information processing terminal 3 (refer to the authentication process below).

The reception unit 42 receives various items of information from the information processing terminal 3 (refer to the authentication process below).

The storage unit 43 may include memory and storage, and may also include a temporary storage unit (not shown) for temporarily storing information.

The processing unit 44, which is an MPU, serves as a controller for the server 4 (refer to the authentication process below).

The information processing apparatus 5 is an in-vehicle device installed in a movable object such as a vehicle. As shown in FIG. 2, the information processing apparatus includes at least an input unit 51, an output unit 52, a transmission unit 53, a reception unit 54, a storage unit 55, and a processing unit 56. The information processing apparatus 5 is defined as a peripheral device serving as a slave in the information processing system 1. In the present embodiment, the information processing apparatus 5 may be in any form, other than an in-vehicle device installed in a movable object. The information processing apparatus 5 is communicably connected to the server 4 via the information processing terminal 3 to allow transmission and reception of information including information needed for activation and any other information (e.g., navigation, map, or vehicle information) between the information processing apparatus 5 and the server 4.

The input unit 51 may include a touch panel and a physical button that receive an operational input (touch input into the touch panel), and a microphone that receives an audio input.

The output unit 52 may include a display (touch sensitive) that shows various items of information and a speaker or an audio output terminal that outputs sound. Various items of information herein include navigation, map, vehicle, and audio information.

The transmission unit 53 transmits such various items of information to the information processing terminal 3. In the present embodiment, the transmission unit 53 transmits authentication information for activation. The transmission unit 53 may also transmit various items of information to the server 4 directly or via the information processing terminal 3. In the present embodiment, authentication information for activation is transmitted to the server 4 not directly but via the information processing terminal 3.

The reception unit 54 receives various items of information from the server 4 and the information processing terminal 3. In the present embodiment, the reception unit 54 receives authentication information for activation. The reception unit 54 may also receive various items of information from the server 4 directly or via the information processing terminal 3. In the present embodiment, authentication information for activation is received from the server 4 not directly but via the information processing terminal 3.

The storage unit 55 may include memory and storage, and may also include a temporary storage unit (not shown) for temporarily storing information.

The processing unit 56, which is an MPU, serves as a controller for the information processing apparatus 5 (refer to the authentication process below).

The information processing terminal 3, the server 4, and the information processing apparatus 5 each include at least a central processing unit (CPU), a storage unit, and input and output units. The CPU, the storage unit, and the input and output units are known components, and will not be described or shown.

The information processing system 1 including the information processing terminal 3, the server 4, and the information processing apparatus 5 allows the information processing terminal 3 to perform authentication of the information processing apparatus 5 with the server 4 (refer to the authentication process below). More specifically, the information processing terminal 3 obtains identification information about the information processing apparatus 5 and performs authentication of the information processing apparatus 5 with the server 4 based on the obtained identification information. The authentication in this embodiment involves setting an authentication validity period. The authentication includes payment.

An activation method (an information processing method according to the claimed invention) used by the information processing system 1 according to the present embodiment will now be described with reference to the drawings (refer to FIGS. 3 and 4). The method (process) according to the present embodiment is used for activation (authentication) of the navigation function of the information processing apparatus 5, which is an in-vehicle device.

First, the information processing terminal 3 is defined as a central device, and the server 4 and the information processing apparatus 5 are defined as peripheral devices in the information processing system 1. As shown in FIG. 3, the information processing terminal 3 and the server 4 are then communicably connected to each other with the network 2, and the information processing terminal 3 and the information processing apparatus 5 are communicably connected to each other with a short-range communication technology. The information processing terminal 3 then performs authentication (activation) of the navigation function of the information processing apparatus 5 with the server 4.

Figure 3:
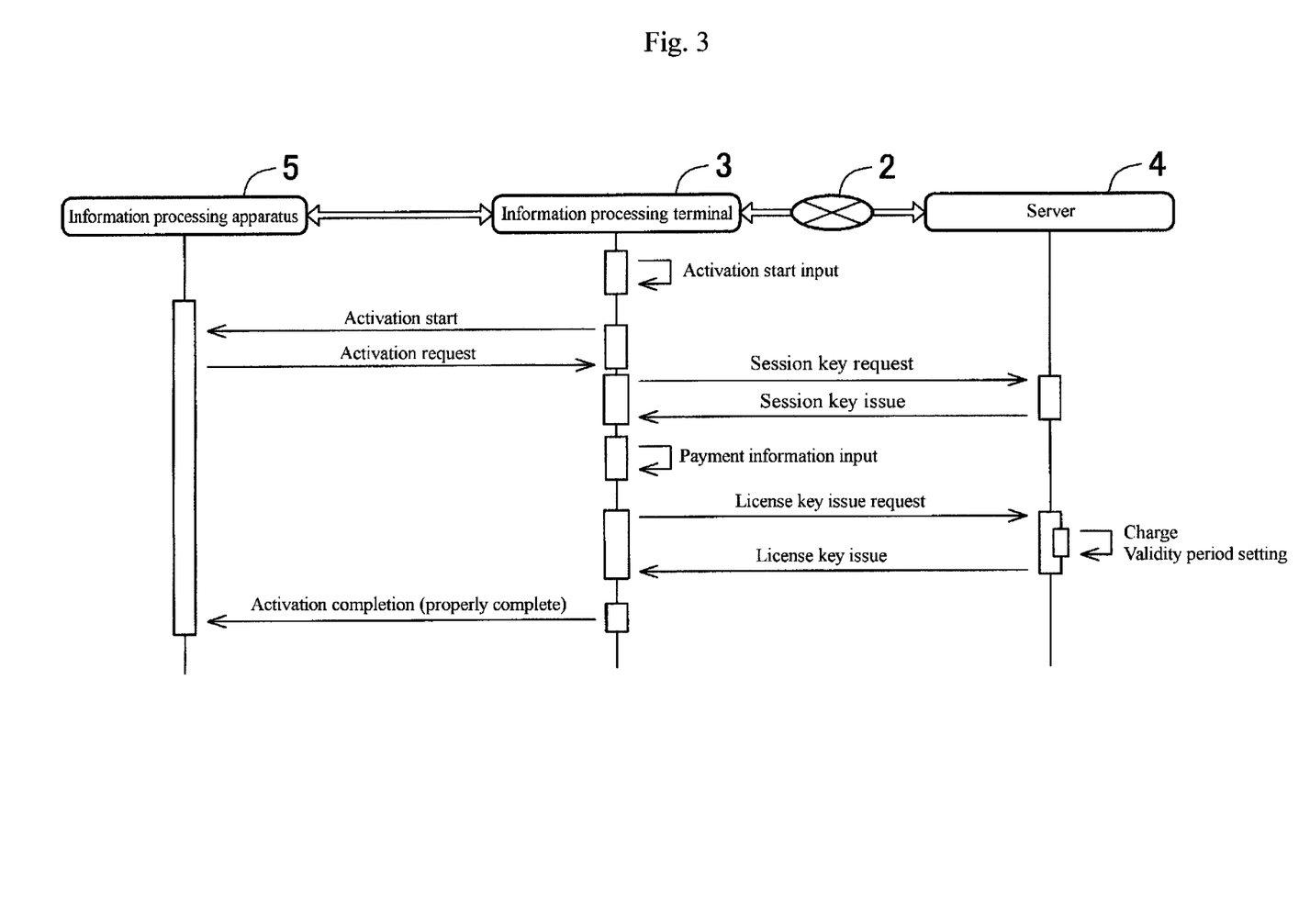
FIG. 3 is a sequence diagram of activation of the information processing system according to the embodiment.
Figure 4:
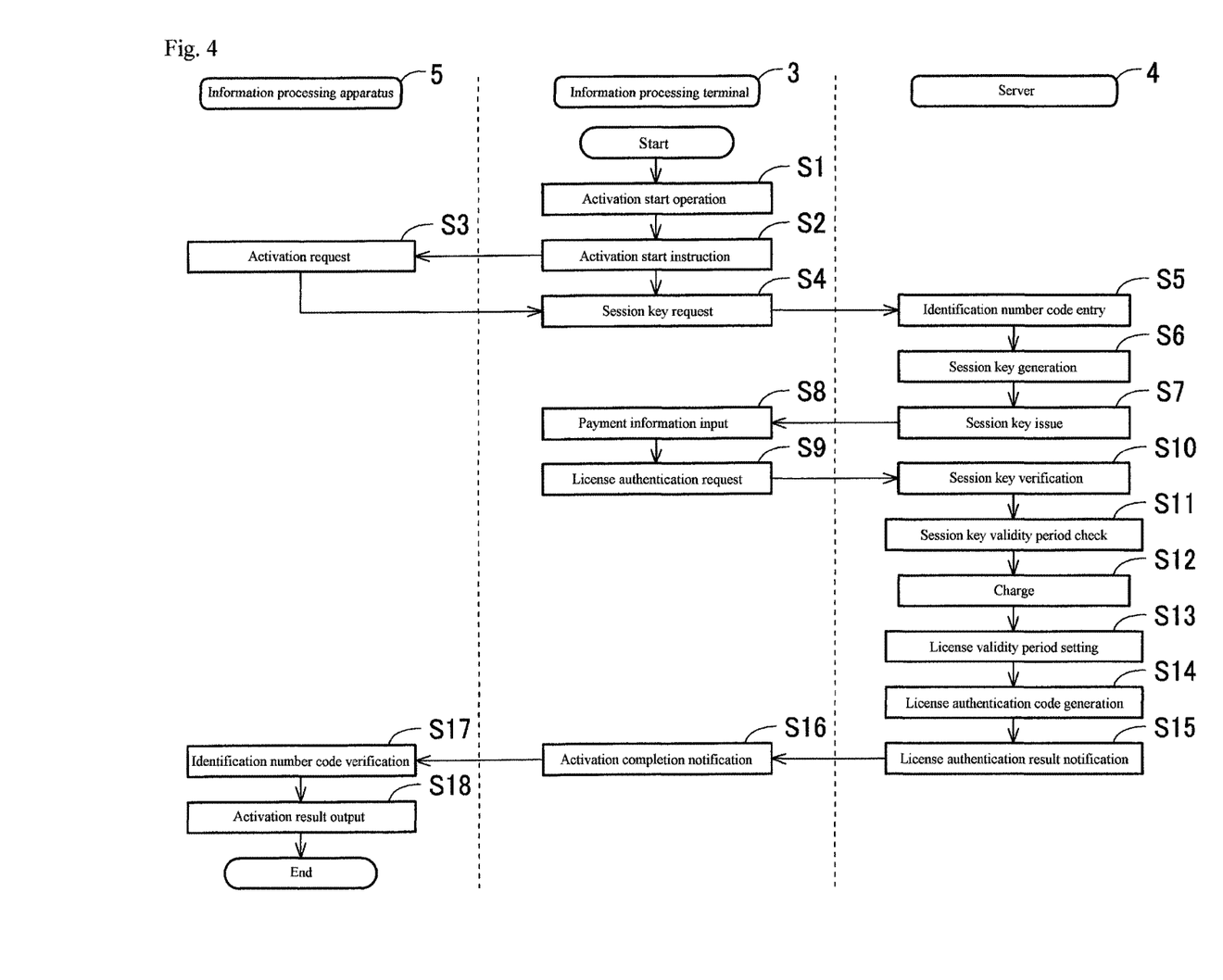
FIG. 4 is a flowchart of activation of the information processing system according to the embodiment.

As shown in FIGS. 3 and 4, the information processing terminal 3 is operated to start activating the information processing apparatus 5, which is an in-vehicle device (step S1: activation start operation).

After step S1, the information processing terminal 3 transmits an activation start instruction to the information processing apparatus 5 (step S2: activation start instruction).

After step S2, the information processing apparatus 5 requests the activation from the information processing terminal 3 (step S3: activation request). In this step, the information processing apparatus 5 encrypts and transmits its unit recognition number, which is identification information (the vehicle identification number code, or VIN code, which is a vehicle-specific identification number code in the present embodiment), to the information processing terminal 3. Although the identification number code is encrypted based on an existing encryption scheme, this is a mere example and such encryption may be unnecessary.

Upon receiving the identification number code, the information processing terminal 3 requests a session key from the server 4 (step S4: session key request). In this step, the information processing terminal 3 transmits the identification number code to the server 4.

Upon receiving the identification number code, the server 4 decrypts the code and enters the decrypted identification number code into the storage unit 43 storing a database (step S5: identification number code entry).

After step S5, the server 4 generates a session key (random numbers) based on the identification number code. The session key has a preset validity period, which is 30 min in the present embodiment (step S6: session key generation).

After step S6, the server 4 issues a session key for the information processing terminal 3 by encrypting the session key generated in the server 4 and transmitting the encrypted session key to the information processing terminal 3 (step S7: session key issue). The issue date and time, and the validity period of the session key are determined when the session key is generated in step S6. In the present embodiment, the validity period is 30 min. In other words, the session key in the present embodiment is valid for 30 min from the issue. The session key is not reissued within the validity period. Although the session key is encrypted based on an existing encryption scheme, this is a mere example and such encryption may be unnecessary.

Upon receiving the session key after step S7, the information processing terminal 3 prepares for payment for this activation, and receives payment information input into the information processing terminal 3 (step S8: payment information input).

After receiving the payment information input for settling the payment, the information processing terminal 3 requests license authentication from the server 4 (step S9: license authentication request). In this step, the information processing terminal 3 transmits a license authentication request with the identification number code, the session key, and the payment information to the server 4. In the present embodiment, the identification number code, the session key, and the payment information are transmitted together with the license authentication request from the information processing terminal 3 to the server 4, but this is a mere example. For the session key information including the identification number code, the session key and the payment information may be transmitted from the information processing terminal 3 to the server 4 together with the license authentication request.

In response to the license authentication request from the information processing terminal 3 after step S9, the server 4 verifies the session key received together with the license authentication request against the session key transmitted from the server 4 to the information processing terminal 3 (step S10: session key verification).

When the session keys match in the session key verification, the validity period of the session key is checked to determine whether the session key is valid (step S11: session key validity period check).

When the session key is determined to be valid in step S11 to complete the session key verification and the validity period check, the server 4 settles the payment based on the payment information (step S12: charge).

In the payment in step S12, the server 4 enters the payment information and the validity period information for a license key (refer to below) based on the payment information (step S13: license validity period setting).

After charging (step S12) and setting the validity period (step S13), the server 4 obtains (generates) a license authentication code (license key) based on the session key (step S14: license authentication code generation). The license authentication code uses random numbers. In this step, the payment information is deleted.

After generating the license key, the server 4 transmits the license authentication result to the information processing terminal 3 (step S15: license authentication result notification). In this notification, the license key including information about the identification number code and the session key is encrypted and transmitted from the server 4 to the information processing terminal 3. Although the license key is encrypted based on an existing encryption scheme, this is a mere example and such encryption may be unnecessary.

Upon receiving the license key from the server 4, the information processing terminal 3 transmits the license key including the information about the identification number code and the session key to the information processing apparatus 5 to notify the information processing apparatus 5 that the activation is complete (step S16: activation completion notification).

The information processing apparatus 5 then decrypts the license key and the session key, and verifies the identification number code provided upon requesting the activation against the identification number code received at the completion of the activation (step S17: identification number code verification).

When the identification number codes match in the verification in step S17, the activation is complete properly, and the information processing apparatus 5 displays the activation result (step S18: activation result output). When the identification number codes do not match in the verification in step S17, the processing returns to step S2 to retry the activation. Although the activation result is output in step S18 simply from the output unit 52 in the information processing apparatus 5, this is a mere example. The information processing apparatus 5 may instruct the information processing terminal 3 to output the activation result also from the output unit 32 in the information processing terminal 3.

The information processing system 1, the information processing terminal 3, the information processing method, and the information processing program according to the present embodiment allow the information processing apparatus 5 to be communicably connected to the server 4 and perform authentication (activation in the present embodiment) without inconvenience to the user. Although the authentication in the above embodiment is the activation of application software (navigation system), the authentication may be any other activation, such as activation of system software or activation for obtaining the state of communication use.

In the present embodiment, the information processing terminal 3 is defined as the central device in the information processing system 1 and performs authentication of the information processing apparatus 5 with the server 4 based on the identification information about the information processing apparatus 5 (e.g., the identification number code, which is a unit recognition number). Thus, the information processing terminal 3 can be used to remotely perform the authentication of the information processing apparatus 5. In the present embodiment, the information processing terminal 3 serves as the central device in the information processing system 1 and issues instructions (in, for example, steps S2 and S4) to actively operate the server 4 and the information processing apparatus 5.

More specifically, for the information processing apparatus 5 that is an in-vehicle device installed in a vehicle as described above, the user can perform the activation of the information processing apparatus 5 with the server 4 using the information processing terminal 3 without directly operating the server 4 or the information processing apparatus 5.

In the present embodiment, the information processing terminal 3 is used to perform authentication of the information processing apparatus 5 with the server 4. Thus, communicably connecting the information processing apparatus 5 and the server 4 directly to each other may be unnecessary, and thus the authentication can be performed in any place. The present embodiment (the present invention) can be implemented using the information processing apparatus 5 with no communicator directly connecting to the server 4.

Whereas known authentication involves manual input of information into the information processing apparatus 5, the information processing terminal 3 performs authentication of the information processing apparatus 5 with the server 4, improving the convenience of the user.

The information processing terminal 3 obtains the identification information (identification number code) about the information processing apparatus 5 and performs authentication of the information processing apparatus 5 with the server 4 based on the obtained identification information. The information processing terminal 3, which performs authentication of the information processing apparatus 5 with the server 4, serves Abstract the master (initiator) in passing the identification information and the server 4 and the information processing apparatus 5 serve as slaves in passing the identification information.

In the present embodiment, the information processing terminal 3 and the server 4 are connected to each other, and the information processing terminal 3 and the information processing apparatus 5 are connected to each other. The information processing apparatus 5 may eliminate a component for directly communicating with the server 4 to receive authentication with the server 4.

The information processing apparatus 5 may be an in-vehicle device installed in a vehicle as in the present embodiment. To update information in the in-vehicle device with a known technique, the vehicle incorporating the in-vehicle device (e.g., a navigator) is to be brought to a dealer, where the server and the in-vehicle device are communicably connected to each other, and the user or an operator inputs the identification information (e.g., the VIN code, or the identification number code) into the server to allow the server to recognize the in-vehicle device before data update. The known technique uses such manual input into the server for in-vehicle device authentication, lacking the concept of the authentication described in the present embodiment. In the present embodiment, the server 4 does not receive direct manual input, and the information processing terminal 3, in place of the information processing apparatus 5, performs the authentication with the server 4 using the identification information about the information processing apparatus 5. The information processing system 1 thus uses the authentication to identify the information processing apparatus 5.

The authentication including payment can be used for fee-based services and communication. The payment can be performed with the information processing terminal 3 serving as the master, and the information processing apparatus 5 and the server 4 serving as slaves. This structure can eliminate a payment system in the information processing apparatus 5 and simplify the structure of the information processing apparatus 5. The payment system may refer to a system of payment using credit cards and electronic money.

In the present embodiment, the authentication of the information processing apparatus 5 with the server 4 is also used to continuously receive information (services) stored in the server 4, and is useful for such continuous service use. The authentication is particularly useful for services that involve information updates associated with, for example, the communication environment or the map information, or services with a limited period of time or with a limited count of use, such as rental cars or content services (refer to modifications described below).

Figure 5:
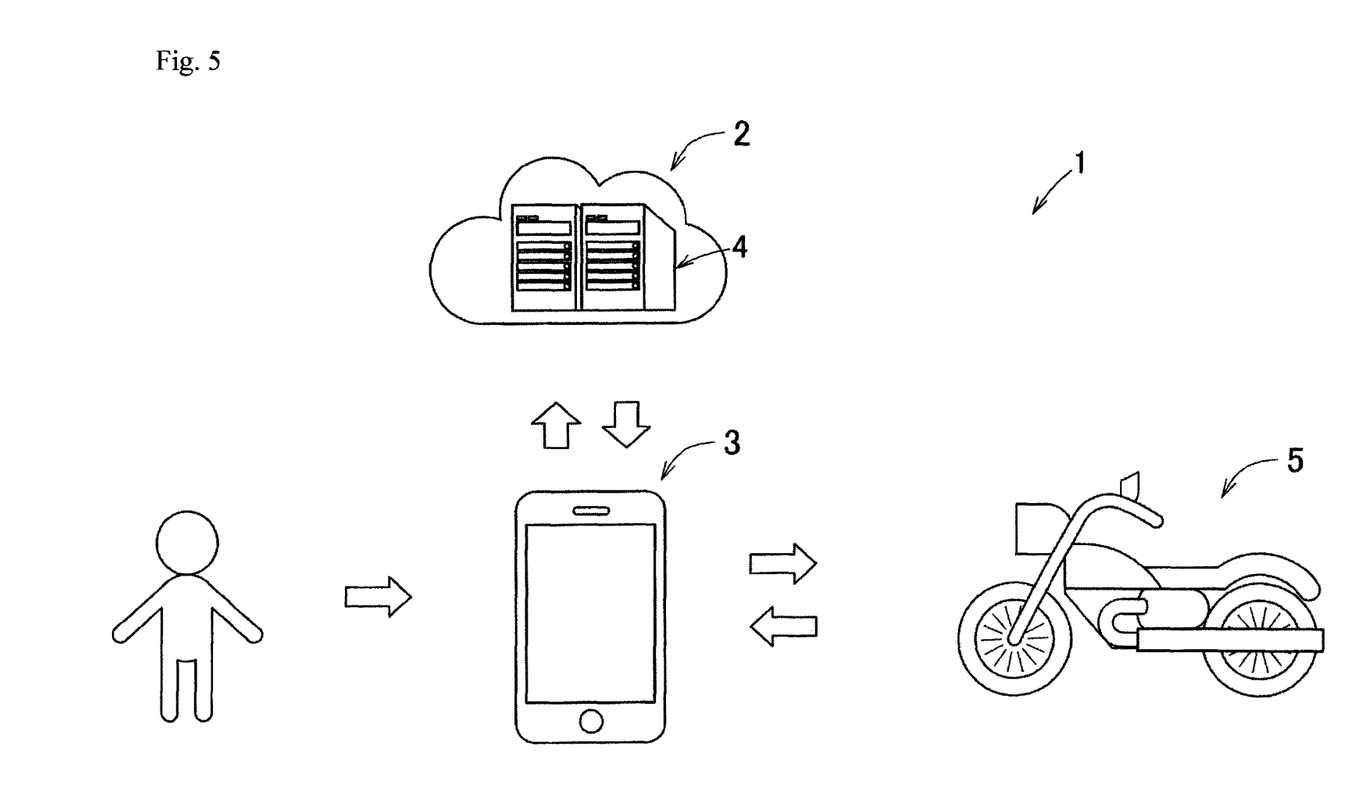
FIG. 5 is a schematic diagram of an information processing system according to another embodiment.

In the present embodiment, the information processing apparatus 5 is an in-vehicle device installed in a vehicle. However, the information processing apparatus 5 may be any other form that allows the information processing terminal 3 to be defined as the central device and the server 4 and the information processing apparatus 5 to be defined as peripheral devices in the information processing system 1, the information processing terminal 3 and the server 4 to be connected to each other, the information processing terminal 3 and the information processing apparatus 5 to be connected to each other, and the information processing terminal 3 to perform authentication of the information processing apparatus 5 with the server 4. More specifically, as shown in FIG. 5, the information processing apparatus 5 may be an in-vehicle device installed in a motorcycle. In some embodiments, as shown in FIGS. 6 and 7, the information processing apparatus 5 may be an on-board device (entertainment device) installed in a passenger transport such as a train or an airplane.

Figure 6:
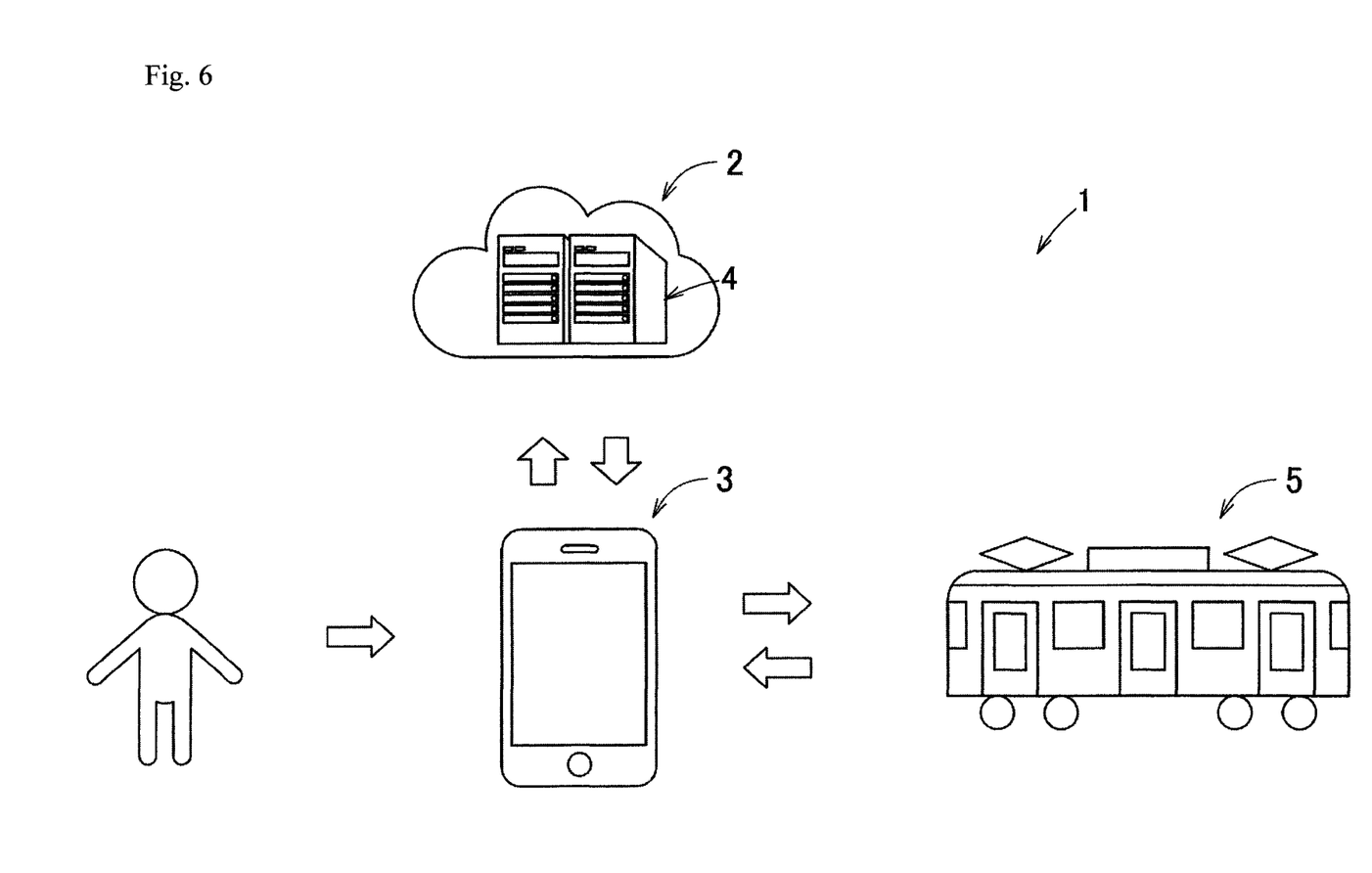
FIG. 6 is a schematic diagram of an information processing system according to still another embodiment.
Figure 7:
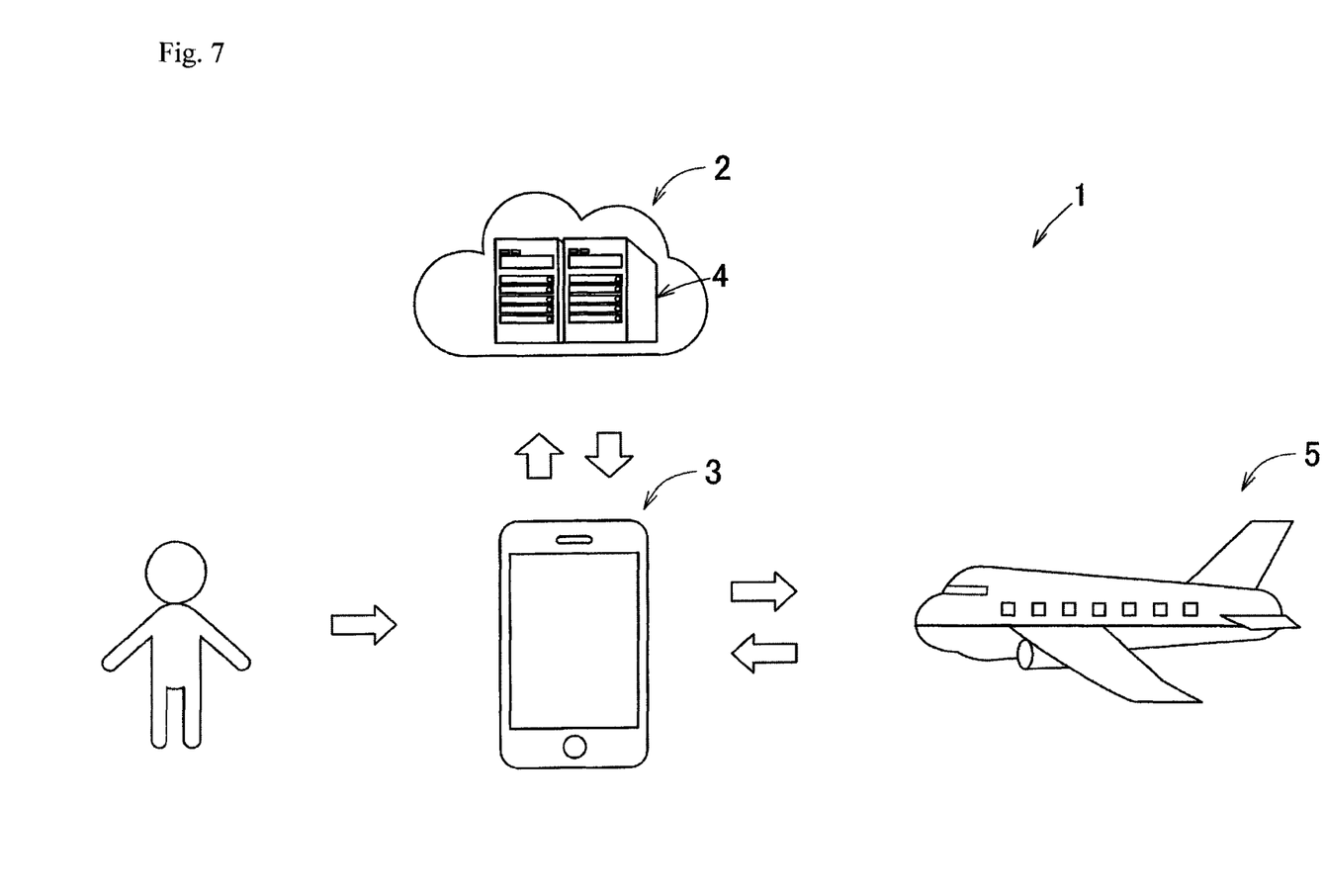
FIG. 7 is a schematic diagram of an information processing system according to still another embodiment.

As shown in FIGS. 6 and 7, the information processing apparatus 5 may be an on-board device (entertainment device) installed in a passenger transport. Although a known on-board device allows users (passengers) to freely select content services or items of information, the known device cannot display fee-based content. This is based on the assumption that free content without any charge is usually offered in a passenger transport. In other words, fee-based content services are commonly unavailable in a passenger transport. In the embodiments shown in FIGS. 6 and 7, the information processing system 1 performs authentication including payment. This information processing system 1 thus allows a passenger, once his or her authentication succeeds, to easily use fee-based content services without inconvenience. More specifically, a passenger in a seat of a passenger transport performs authentication including payment with the server 4 (or a recording medium corresponding to the server 4) by using his or her information processing terminal 3 to obtain the identification number of the information processing apparatus 5 from the information processing apparatus 5 and transmit the obtained identification information to the server 4. The passenger can thus use fee-based content services.

A method for receiving fee-based content services in an entertainment device installed in a passenger transport will now be described. The entertainment device corresponds to the information processing apparatus 5 in the above embodiment and will also refer to the information processing apparatus 5. In the example described below, mileage points (in frequent flyer programs, or FFP) are used in the charging process.

A passenger taking a reserved seat sees the information processing apparatus 5 installed in front of him or her, or on the back of the seat in front of the passenger. The information processing apparatus 5 has multiple items of movies, dramas, and music content including fee-based content and free content. To enable use of one piece of such fee-based content, the information processing apparatus 5 is powered on, and the information processing terminal 3 and the information processing apparatus 5 are connected to each other with a short-range communication technology such as BLE, BT (registered trademark), or Wi-Fi, or directly with a cable. Direct cable connections include, for example, a universal serial bus (USB) connection via a USB cable. After the information processing terminal 3 and the information processing apparatus 5 are connected to each other, fee-based content stored in the information processing apparatus 5 appears on the screen of the information processing terminal 3.

When multiple seats are provided and the information processing terminal 3 may be connected to any of the entertainment devices in the different information processing apparatuses 5, the identification information about the information processing apparatus 5 is not transmitted between the information processing terminal 3 and the information processing apparatus 5 in some embodiment, unlike in the above embodiment. The passenger may be prevented from connecting the information processing terminal 3 to any one of the information processing apparatuses 5 installed in seats other than the reserved seat.

For example, when a passenger passes through a boarding gate, the passenger holds his or her information processing terminal 3 together with the boarding pass over the automatic ticket gate. The automatic ticket gate reads the identification information about the information processing terminal 3 and the seat information on the boarding pass, and transmits the read information to a boarding management terminal that manages boarding information about passengers. The boarding management terminal receives the identification information about the information processing terminal 3 and the reservation information on the boarding pass from the automatic ticket gate, and transmits the identification information about the information processing terminal 3 to the information processing apparatus 5 installed in front of the seat designated by the seat information. The passenger then sits in the seat, and the information processing terminal 3 and the information processing apparatus 5 are connected with a short-range communication technology or directly with a cable to enable the use of the information processing apparatus 5. Then, the information processing apparatus 5 receives the identification information about the information processing terminal 3 from the information processing terminal 3. The information processing apparatus 5 determines whether the identification information about the information processing terminal 3 previously received from the boarding management terminal matches the identification information about the information processing terminal 3 received through the connection with a short-range communication technology or direct connection with a cable. When these identification information items match, fee-based content in the information processing apparatus 5 appears on the screen of the information processing terminal 3. If the identification information items do not match, a message indicating that the content is unavailable appears on the screen. In this manner, the information processing apparatus 5 may be connectable to the specific information processing terminal 3 owned by a specific passenger.

When items of the fee-based content appear on the screen of the information processing terminal 3, the passenger selects a desired item from the displayed content. The content selection corresponds to the input operation to start activation in the above embodiment. For example, the passenger operates the information processing terminal 3 to select a movie available for 30 mileage points. The information processing terminal 3 then transmits an instruction about the selection to the information processing apparatus 5. In response to the instruction about the content selection from the information processing terminal 3, the information processing apparatus 5 transmits a charge request to the information processing terminal 3. The charge request corresponds to the activation request in the above embodiment.

In response to the charge request, the information processing terminal 3 connects to the server 4 outside the passenger transport via on-board Wi-Fi or other technology. The connection corresponds to the session key request to the server 4 in the above embodiment. The information processing terminal 3 then obtains the mileage point information about the passenger from the server 4. Obtaining the mileage point information corresponds to the session key issue in the above embodiment.

After the information processing terminal 3 obtains the mileage point information, the passenger inputs 30 mileage points into the information processing terminal 3. The mileage point input corresponds to the payment information input in the above embodiment. The information processing terminal 3 transmits information about the input mileage points to the server 4. Transmitting the mileage point information corresponds to the license key issue request in the above embodiment. The input or the transmission of the mileage points is the operation for using the passenger's mileage points.

Upon receiving the input mileage point information, the server 4 subtracts 30 mileage points from the passenger's mileage points. Subtracting the mileage points corresponds to the charging in the above embodiment. After subtracting the mileage points, the server 4 transmits the charging completion information indicating that the charging process is complete to the information processing terminal 3.

Upon receiving the charging completion information, the information processing terminal 3 transmits the charging completion information and the information about the selected content together to the entertainment device. Transmitting the charging completion information and the information about the selected content corresponds to the activation completion notification in the above embodiment. The content selected by the passenger is then available for playback on the information processing apparatus 5.

In the present embodiment, a program is implemented to cause a computer to function as the information processing system 1. The computer includes components corresponding to the components included in the information processing system 1 as described above.

The above program is an information processing program for the information processing system 1 including the information processing terminal 3, the server 4, and the information processing apparatus 5. The information processing program includes at least defining the information processing terminal 3 as the central device in the information processing system 1, defining the server 4 and the information processing apparatus 5 as peripheral devices, connecting the information processing terminal 3 and the server 4 to each other, connecting the information processing terminal 3 and the information processing apparatus 5 to each other, and causing the information processing terminal 3 to perform authentication of the information processing apparatus 5 with the server 4. The information processing program produces the same advantageous effects as the information processing system 1 according to the present embodiment.

The present invention may be embodied in various other forms without departing from the spirit or the main features of the present invention. The embodiments described above are thus merely illustrative in all respects and should not be construed to be restrictive. In other words, the above embodiments are mere examples.

This application claims priority to Japanese Patent Application No. 2016-112135, filed in Japan on Jun. 3, 2016, the entire contents of which are incorporated herein by reference.

INDUSTRIAL APPLICABILITY

The present invention is applicable to an information processing apparatus such as an in-vehicle device or an on-board device that performs authentication such as activation.

REFERENCE SIGNS LIST 1 information processing system
2 network
3 information processing terminal
31 input unit
32 output unit
33 transmission unit
34 reception unit
35 storage unit
36 processing unit
4 server 41 transmission unit
42 reception unit
43 storage unit
44 processing unit
5 information processing apparatus
51 input unit
52 output unit
53 transmission unit
54 reception unit
55 storage unit
56 processing unit

The invention claimed is:
1. An information processing system, comprising:
an information processing terminal;
a server; and
an information processing apparatus,
wherein the information processing terminal is defined as a central device, and the server and the information processing apparatus are defined as peripheral devices in the information processing system; and
the information processing terminal and the server are connected to each other, and the information processing terminal and the information processing apparatus are connected to each other,
wherein the information processing terminal comprises:
a terminal input device configured to be operated to start activating the information processing apparatus;
a terminal transmitter that transmits an activation start instruction to the information processing apparatus;
a terminal receiver that receives an activation request for activating the information processing apparatus from the information processing apparatus, the activation request being generated based on the activation start instruction,
a processor that obtains identification information about the information processing apparatus and performs authentication of the information processing apparatus with the server based on the obtained identification information,
wherein:
the authentication includes settling of payment;
the information processing terminal causes the information processing apparatus to receive information about services stored in the server after completion of activating the information processing; apparatus;
the terminal transmitter transmits the identification information to the server, in a case that the terminal transmitter requests a session key generated by the server to the server;
in the settling of payment, after the terminal receiver receives the session key, payment for the activation of the information processing apparatus is settled based on payment information;
after the settling of payment, the terminal transmitter transmits a license authentication request to the server for giving a license authentication;
as a result of the license authentication, when the terminal receiver receives a license key generated by the server from the server, the terminal transmitter transmits the license key to the information processing apparatus;
the license authentication request includes the identification information, the session key, and the payment information; and
the license key includes the identification information and information about the session key, wherein the server comprises:
a server receiver that receives the identification information from the information processing terminal when the information terminal requests the session key;
a processor that generates the session key based on the identification information;
a server transmitter that transmits the session key to the information processing terminal;
the server receiver receives the license authentication request from the information processing terminal;
the processor of the server generates the license key when the session key transmitted from the server transmitter to the information processing terminal matches in the session key included in the license authentication request received by the server receiver;
the server transmitter transmits a determination, whether or not the license authentication request is approved based on the license key, to the information processing terminal,
wherein the information processing apparatus comprises:
a transmitter that transmits the identification information to the information processing terminal and the activation request for activating the information processing apparatus; and
a receiver that receives the license key and a notification of the completion of activating the information processing apparatus,
wherein: a processor of the information processing apparatus verifies whether or not the identification information transmitted with the activation request matches in the license key received with the notification; and
the processor of the information processing apparatus performs the completion of activating the information processing apparatus, in a case that the identification information transmitted by the transmitter matches in the license key received by the receiver.
2. The information processing system according to claim 1, wherein
the services are associated with information updates, and is available for limited periods of time or with limited counts of use, and
the authentication includes setting an authentication validity period in which the services are available for use.
3. The information processing system according to claim 1,
wherein:
the session key is associated with issue date and time, and a validity period of the session key; and
when the session key transmitted from the server transmitter to the information processing terminal matches in the session key included in the license authentication request received by the server receiver and it is in the validity period of the session key, the processor of the server does not reissue the session key.
4. An information processing method performed by an information processing system including an information processing terminal, a server, and a information processing apparatus, the method comprising:
defining an information processing terminal as a central device and a server and an information processing apparatus as peripheral devices in an information processing system;

connecting the information processing terminal and the server to each other and the information processing terminal and the information processing apparatus to each other; and obtaining, with the information processing terminal, identification information about the information processing apparatus, and performing authentication of the information processing apparatus with the server based on the obtained identification information, wherein the authentication includes settling of payment, and the information processing apparatus receives information about services stored in the server after completion of activating the information processing apparatus, wherein the method further comprising:

transmitting, by the information processing terminal, an activation start instruction to the information processing apparatus, when an input operation is performed to start activating the information processing apparatus;

receiving, by the information processing terminal, an activation request for activating the information processing apparatus from the information processing apparatus;

performing authentication of the information processing apparatus, by the information processing terminal, with the server based on the obtained identification information;

transmitting, by the information processing terminal, the identification information to the server, in a case that the terminal transmitter requests a session key generated by the server to the server;

after reception of the session key by the information processing terminal, settling payment for the activation of the information processing apparatus based on payment information;

transmitting, by the terminal transmitter, a license authentication request to the server for giving a license authentication after the settling of payment; and as a result of the license authentication, transmitting, by the information processing terminal, the license key to the information processing apparatus, upon reception of a license key generated by the server from the server, wherein: the license authentication request includes the identification information, the session key, and the payment information; and the license key includes the identification information and information about the session key.

5. A non-transitory computer-readable recording medium recording a program for causing a computer to execute a control method for an information processing terminal included in an information processing system, the system including the information processing terminal, a server, and an information processing apparatus, the program being configured to implement:

defining the information processing terminal as a central device and the information processing apparatus and the server as peripheral devices in the information processing system;

connecting the information processing terminal and the server to each other and the information processing terminal and the information processing apparatus to each other;

transmitting, by the information processing terminal, an activation start instruction to the information processing apparatus, when an input operation is performed to start activating the information processing apparatus;

receiving, by the information processing terminal, an activation request for activating the information processing apparatus from the information processing apparatus;

obtaining, by the information processing terminal, identification information about the information processing apparatus, and making the information processing terminal perform, as a terminal processing unit, authentication of the information processing apparatus with the server based on the obtained identification information, the authentication including payment;

making the information processing apparatus receive information about services stored in the server after completion of activating the information processing apparatus;

transmitting, by the information processing terminal, the identification information to the server, in a case that the terminal transmitter requests a session key generated by the server to the server;

in the settling of payment, after reception of the session key by the information processing terminal, settling payment for the activation of the information processing apparatus based on payment information;

transmitting, by the terminal transmitter, a license authentication request to the server for giving a license authentication after the settling of payment; and as a result of the license authentication, transmitting, by the information processing terminal, the license key to the information processing apparatus, upon reception of a license key generated by the server from the server, wherein: the license authentication request includes the identification information, the session key, and the payment information; and the license key includes the identification information and information about the session key.

6. The information processing system according to claim 2, wherein:

the session key is associated with issue date and time, and a validity period of the session key; and when the session key transmitted from the server transmitter to the information processing terminal matches in the session key included in the license authentication request received by the server receiver and it is in the validity period of the session key, the processor of the server does not reissue the session key.

* * * * *

UNITED STATES PATENT AND TRADEMARK OFFICE
CERTIFICATE OF CORRECTION

PATENT NO. : 10,826,884 B2  
APPLICATION NO. : 16/306313  
DATED : November 3, 2020  
INVENTOR(S) : Okazaki Page 1 of 1

It is certified that error appears in the above-identified patent and that said Letters Patent is hereby corrected as shown below:

On the Title Page

Under item (12), "Okazaki et al." should read --Okazaki--.

Item (72), Line 2, delete "Makoto Ito, Hyogo (JP)".

Signed and Sealed this  
Sixth Day of July, 2021

Drew Hirshfeld  
*Performing the Functions and Duties of the  
Under Secretary of Commerce for Intellectual Property and  
Director of the United States Patent and Trademark Office*